US008566840B2

(12) United States Patent
Drepper (10) Patent No.: US 8,566,840 B2
(45) Date of Patent: Oct. 22, 2013

(54) METHOD AND SYSTEM FOR KERNEL LEVEL FILTERING

(75) Inventor: Ulrich Drepper, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1598 days.

(21) Appl. No.: 11/361,958

(22) Filed: Feb. 27, 2006

(65) Prior Publication Data

US 2007/0204274 A1   Aug. 30, 2007

(51) Int. Cl.
*G06F 13/00* (2006.01)
*G06F 15/16* (2006.01)
*G06F 17/30* (2006.01)
*G06F 3/00* (2006.01)

(52) U.S. Cl.
USPC ........... 719/312; 709/203; 707/754; 707/791; 715/234

(58) Field of Classification Search
USPC ............................ 719/313; 709/238; 707/754
See application file for complete search history.

(56) References Cited

U.S. PATENT DOCUMENTS

| 5,047,917 | A | * | 9/1991 | Athas et al. | 719/314 |
| 5,557,798 | A | * | 9/1996 | Skeen et al. | 705/35 |
| 6,067,569 | A | * | 5/2000 | Khaki et al. | 709/224 |
| 6,381,602 | B1 | * | 4/2002 | Shoroff et al. | 1/1 |
| 6,434,618 | B1 | * | 8/2002 | Cohen et al. | 709/228 |
| 6,930,978 | B2 | * | 8/2005 | Sharp et al. | 370/229 |
| 7,124,299 | B2 | * | 10/2006 | Dick et al. | 713/178 |
| 7,168,078 | B2 | * | 1/2007 | Bar et al. | 719/320 |
| 7,506,030 | B2 | * | 3/2009 | Rouse et al. | 709/206 |
| 7,694,344 | B1 | * | 4/2010 | Fletcher et al. | 726/28 |
| 2006/0123425 | A1 | * | 6/2006 | Ramarao et al. | 719/313 |

* cited by examiner

*Primary Examiner* — LeChi Truong
*Assistant Examiner* — Phuong Hoang
(74) *Attorney, Agent, or Firm* — Lowenstein Sandler LLP

(57) ABSTRACT

An embodiment of the invention pertains to a method of filtering messages in a kernel of an operating system. The method includes receiving message traffic from network and determining information that indicates contents of each message in the kernel. The method also includes selectively passing the message from the kernel to one or more applications based on the information and according to at least one criterion, where the least one criterion is associated with a respective application of the one or more applications.

14 Claims, 6 Drawing Sheets

METHOD AND SYSTEM FOR KERNEL LEVEL FILTERING

FIELD

This invention generally relates to messaging. More particularly, the invention relates to a method and system for kernel level filtering of messages.

DESCRIPTION OF THE RELATED ART

Enterprise messaging, also referred to as middleware, allows distributed applications to communicate with each other. Software vendors that offer enterprise messaging systems include IBM, TIBCO, Sonic Software, Sun Microsystems, etc. Examples of implementations of these systems include MQ by IBM, Enterprise Messaging Service by TIBCO and Java Messaging System by Sun.

The conventional enterprise messaging systems are a predominantly user level implementation, which use the application program interfaces (APIs) of the underlying operating systems (e.g., Unix, Windows, etc.). In other words, the conventional enterprise messaging system typically does not modify the underlying operating system. Instead, the conventional systems use APIs to interface and manipulate the underlying operating system.

One aspect of enterprise messaging systems is that each receiver of messages may select the type of message it is should receive. The network message traffic of an enterprise messaging system includes many types of messages that can be generated depending on the number and/or type of applications involved. An individual application may be interested in a fraction of the network message traffic. For example, a financial application may be not interested a shipment-received-notice-message. Accordingly, enterprise messaging system typically includes mechanisms that can filter the network message traffic for relevant messages.

As described earlier, the enterprise messaging systems are typically implemented above the kernel. Network message traffic directed to the messaging system always has to be made available to the user level code implementing the messaging infrastructure. Typically, this involves at least one copy of the network packet being forwarded from the kernel to the user level code. This might have to be repeated for a plurality of receivers. With many messages and possibly significant sizes, the forwarding of network message traffic puts a tremendous stress on the memory handling of the kernel and of the CPU. The unnecessary handling of to-be-discarded messages also induces delays in the channel to the messaging code for relevant messages. These delays are crucial in that the quality of a messaging implementation is measured, among other factors, by the latency to receive the message.

Figure 7:
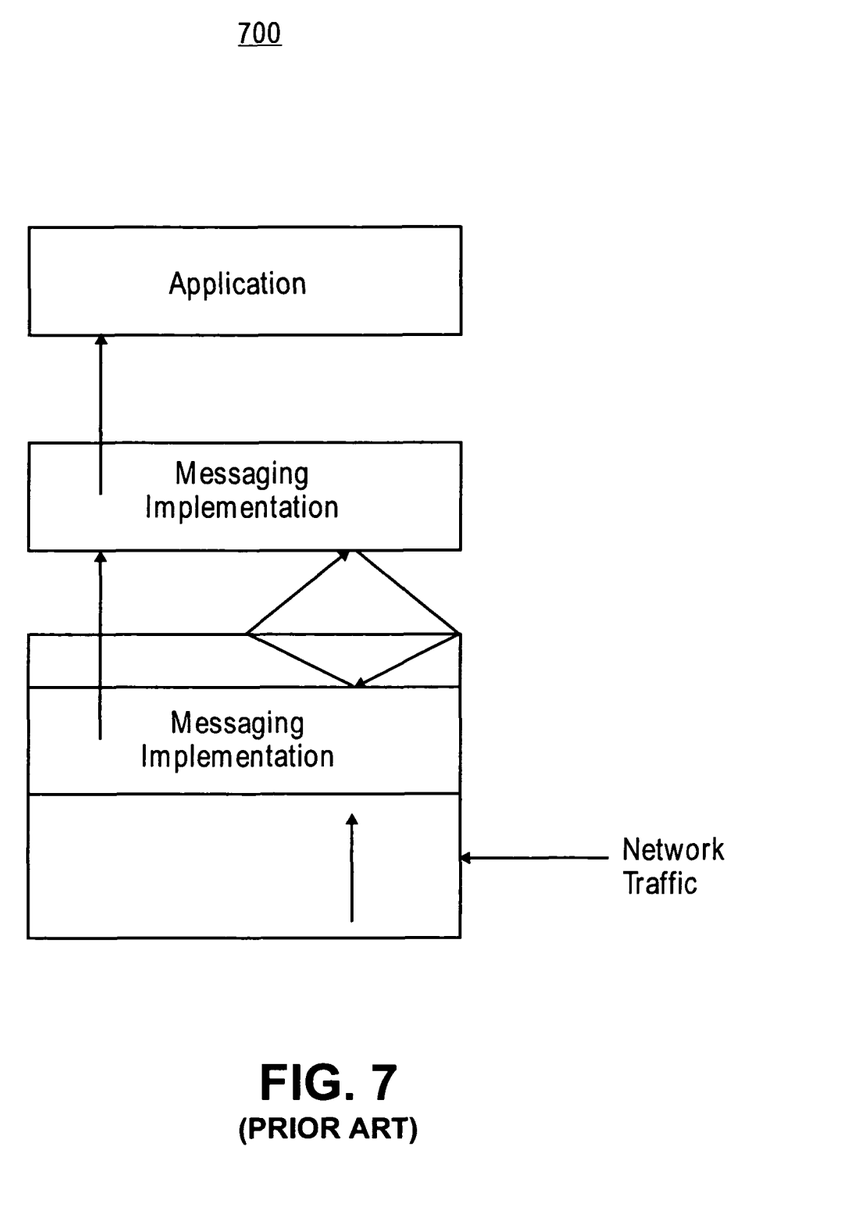
FIG. 7 illustrates an exemplary diagram of messaging system implementing message filtering.

One solution to improving the filtering is to use callback functions to filter network message traffic, which is depicted in FIG. 7. As shown in FIG. 7, an application 705 may interface with a kernel 710 through a two-section messaging implementation 715a, 715b. Section 715a of the messaging implementation remains between the application 705 and the kernel 710 as with conventional enterprise systems. Section 715b of the messaging implementation would be placed into kernel 710. The section 715b may be configured to process the network message traffic and to forward the message to section 715a. Section 715b of the messaging implementation may initiate a callback to section 715a to determine relevancy. Section 715a of the messaging implementation may apply its criteria to the message and return from the callback to section 715b with the result of the filtering.

Since the filters are callback functions in the messaging implementations, this induces two expensive kernel-user level transitions to run the code at user level and at least parts of the message needs to be transported to the user level to provide the callback filter functions with enough information so that it can make a decision. As such, there are not necessarily improvements in latency and higher costs in implementing the callback filters.

SUMMARY

One embodiment pertains to a method of filtering messages in a kernel of an operating system. The method includes receiving message traffic from a network and determining information that indicates contents of each message in the kernel. The method also includes selectively passing the message from the kernel to one or more applications based on the information and according to at least one criterion, where the least one criterion is associated with a respective application of the one or more applications.

Another embodiment generally relates to a computer readable storage medium on which is embedded one or more computer programs. The one or more computer programs implements a method of filtering network messages. The one or more computer programs include a set of instructions for receiving message traffic from a network and determining information that indicates contents of each message in the kernel. The set of instructions also include instructions for selectively passing the message from the kernel to one or more applications based on the information and according to at least one criterion, where the least one criterion is associated with a respective application of the one or more applications.

Yet another embodiment generally pertains to a system for filtering network message packets. The system includes a memory and at least one processor configured to interface with the memory and to execute a kernel filtering process in a kernel. The kernel filtering process is configured to receive message traffic from a network and determine information that indicates contents of each message in the kernel. The kernel filtering process is further configured to selectively pass the message from the kernel to one or more applications based on the information and according to at least one criterion, where the least one criterion is associated with a respective application of the one or more applications.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of networked computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to a method and system for filtering of enterprise messages in the kernel. More particularly, a kernel filtering process operating in kernel space may be configured to process received message traffic. The kernel filtering process may examine a protocol header in each message. The filtering process may compare the information in the protocol header with one or more criteria associated with an application. An application may define the one or more criteria for the kernel. Accordingly, the kernel may determine whether a receive message is relevant for the respective application based on comparison of the information in the protocol header and the one or more criteria. A user of an application may define the one or more criteria to reduce the flow of traffic being passed from the kernel to the application. Conversely, an application may not define a criterion and all the receive message traffic may be forwarded to the application.

In some embodiments, the one or more filtering criteria may be applied to data embedded in the protocol header. The data may be formatted using a structured mark-up language, e.g., XML. Accordingly, the protocol header may contain the information necessary to apply against the one or more filtering criteria.

In other embodiments, the user may specify filtering criteria using a structured mark-up language, e.g., XSLT or XQuery. During runtime for the application, the application may pass down a string containing the markup data to the kernel filtering process. Accordingly, as network message traffic is received, the kernel filtering process may filter the messages based on the user-defined markup data.

Figure 1:
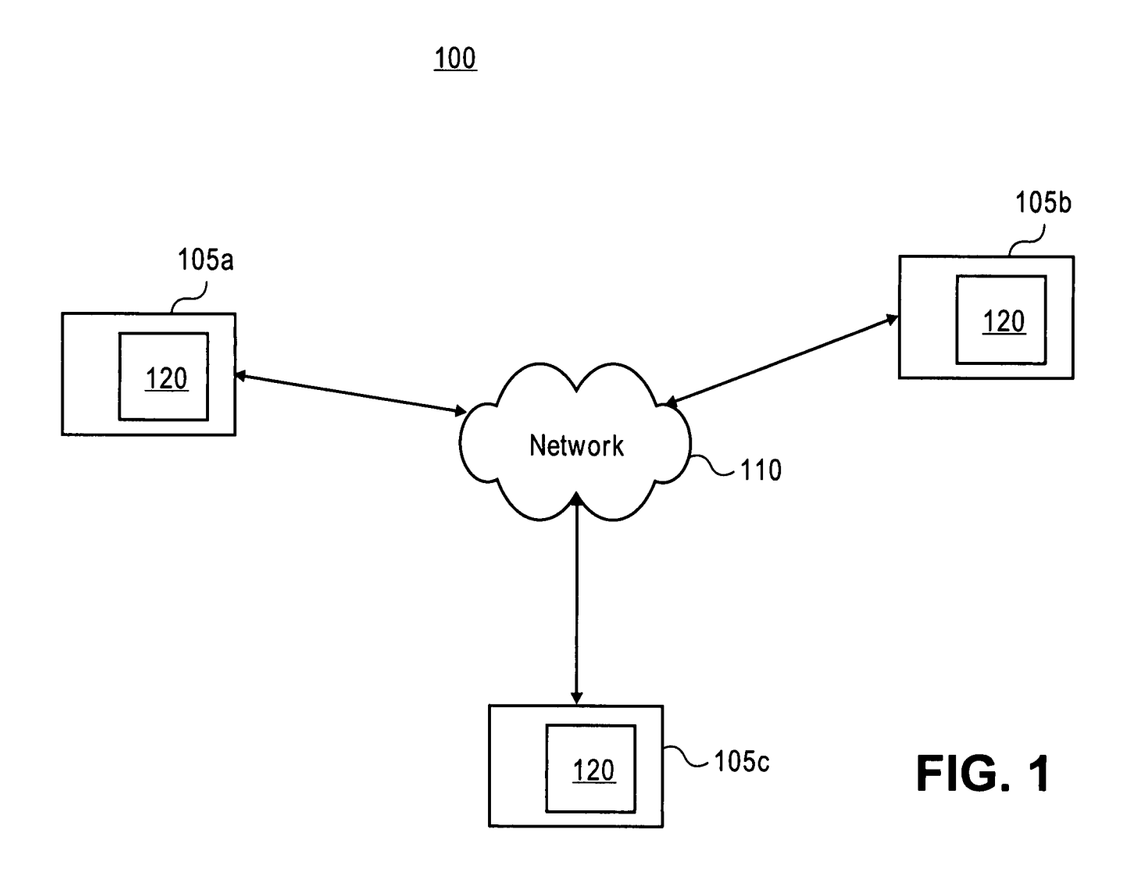
FIG. 1 illustrates an exemplary block diagram of a system in accordance with an embodiment of the invention.

FIG. 1 illustrates a block diagram of a system 100 in accordance with an embodiment. It should be readily apparent to those of ordinary skill in the art that the system 100 depicted in FIG. 1 represents a generalized schematic illustration and that other components may be added or existing components may be removed or modified.

As shown in FIG. 1, the system 100 includes multiple computing platforms 105a-c connected by a network 110. The computing platforms 105a-c may be implemented using personal computers, laptops, workstations, and other similar devices. The computing platforms 105a-c may interface with the network 110 through a network interface (not shown). The network 110 may be implemented using local area networks, wide area networks or combinations thereof.

Each computing platform 105 may execute at least one application that generates messages to the other applications executing on their respective computing platforms and/or execute at least one-application that processes messages. An example of this type of application may be an enterprise messaging application. The application may execute with an operating system with a kernel filtering process 120. More particularly, the kernel filtering process 120 may be configured to examine network packets as they are received and to examine the metadata contained in a header of the received network packet. The kernel filtering process 120 may compare the metadata with at least one criterion provided by the application during initialization. If the metadata matches the at least one criterion, the network packet is passed to the application. Otherwise, if the metadata does not match the at least one criterion, the network packet is discarded. Accordingly, unlike conventional filtering that occurs at the application level when all. the network packets are passed from the kernel, the kernel filtering process provides a mechanism to reduce the number network packets being pass to the user-level. Thus, the overall performance of the operating system may be improved because of the overall reduction in passing non-relevant network packets from the network interface to the application level.

Figure 2:
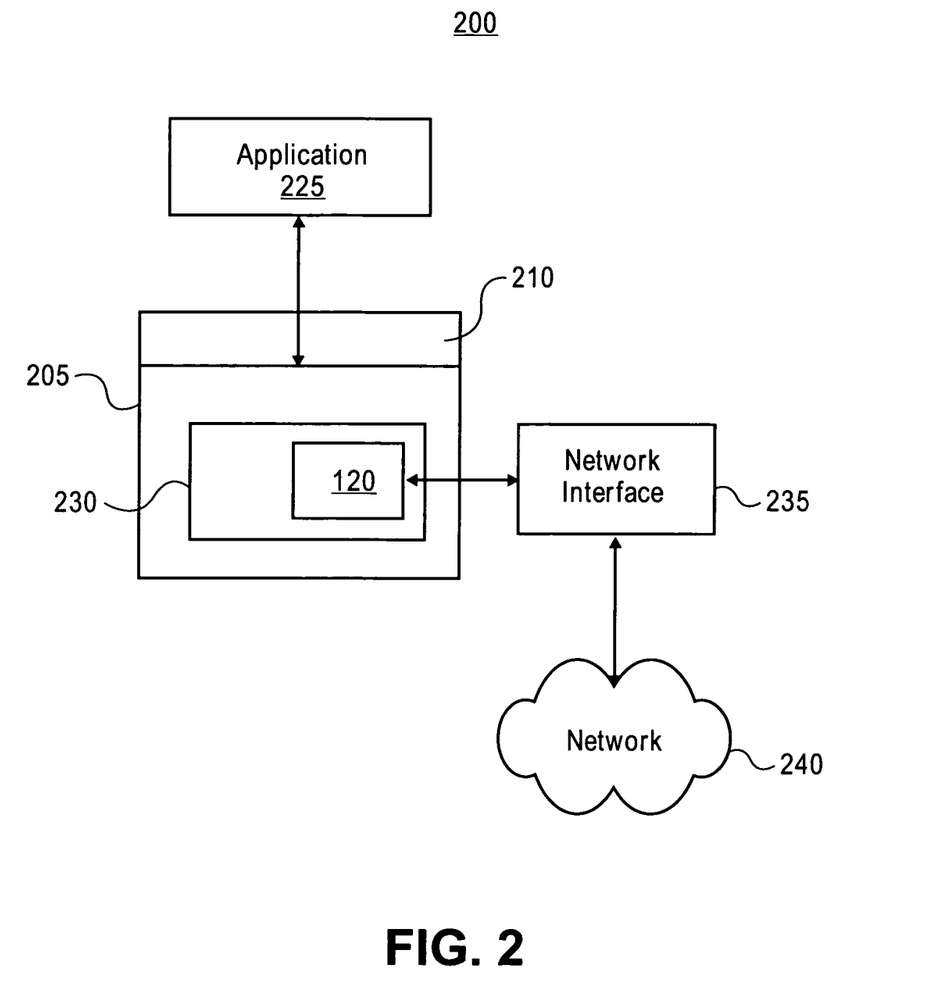
FIG. 2 illustrates an exemplary architecture diagram of the kernel filtering process in accordance with another embodiment of the invention.

FIG. 2 illustrates an exemplary software environment 200 in accordance with an embodiment. It should be readily apparent to those of ordinary skill in the art that the software environment 200 depicted in FIG. 2 represents a generalized schematic illustration and that other components may be added or existing components may be removed or modified.

As shown in FIG. 2, the software environment 200 may include an operating system 205. The operating system 205 may be a version of a Linux™, UNIX™, or similar multi-tasking operating system. A run-time environment 210 may be configured to execute on the operating system 205. The run-time environment 210 may provide a set of software that supports the execution of applications/programs. The run-time environment 210 may include an application program interface (API). The APIs may be configured to provide a set of routines that the application 225 uses to request lower-level services performed by the operating system 205. The operating system 205 may include a kernel 230. The kernel 230 may be configured to provide secure access to the underlying hardware of a processor. The kernel 230 may also be configured to interface with the network interface 235 for access to the network 240.

In some embodiments, the kernel 230 may execute a kernel processing filtering process 120. As previously described, the kernel processing filtering process 120 may be configured to filter network message traffic at the kernel level as compared with conventional system that pass the network message traffic to the application level for filtering. The work the operating system has to process the network packet for application level filtering is reduced to only the relevant network packets.

Figure 3:
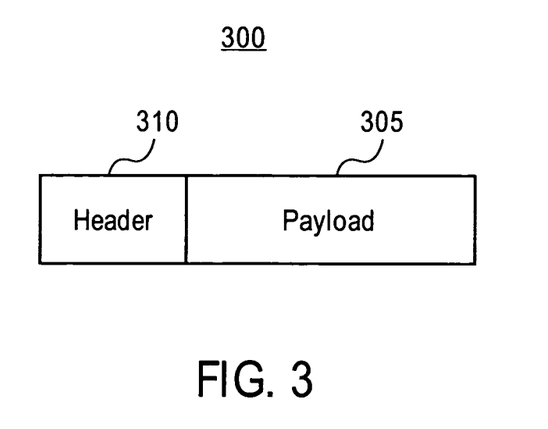
FIG. 3 illustrates an exemplary diagram of a network packet used in an embodiment of the invention.

FIG. 3 illustrates an exemplary network packet in accordance with an embodiment of the invention. It should be readily obvious to one of ordinary skill in the art that FIG. 3 is a schematic illustration and that other components may be added or existing components may be removed or modified As shown in FIG. 3, network packet format 300 is depicted in accordance with a network protocol. The network protocol may be implemented using extensible markup language ("XML") and the well-developed tools associated with XML. The network protocol may include a typical payload 305. The payload 305 may have any form used in applications, for example, enterprise messaging systems, middleware, etc.

The kernel protocol may add a header 310 to the payload 305. The header 310 contains information regarding the data in the payload 305, i.e., similar to metadata. The header 310 may contain self describing data structures to allow the kernel filtering process 120 to filter the network packet 300. More particularly, the header 310 may contain at least one XSLT expression, e.g., "<data class="futuresales"> . . . </data>" that represent the information for the one or filtering criteria to filter upon.

The kernel filtering process 120 may receive at least one filtering criteria during application initialization. The user may specify the criteria using conventional techniques, e.g., dialog boxes, commands, and other similar user interface techniques. When the application is initialized, the filtering criteria may then be passed to the kernel filtering process.

Figure 4:
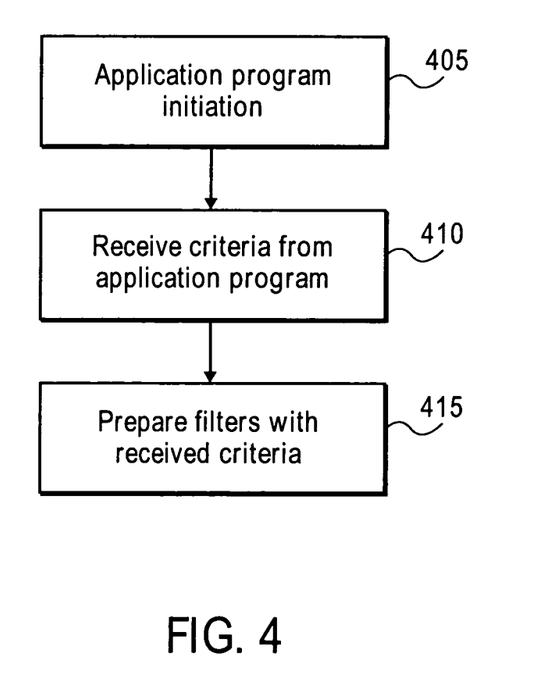
FIG. 4 illustrates flow diagram implemented by the kernel filtering process in accordance with yet another embodiment.

FIG. 4 illustrates a flow diagram 400 implemented by the kernel 230 in accordance with yet another embodiment. It should be readily apparent to those of ordinary skill in the art that the flow diagram 400 depicted in FIG. 4 represents a generalized illustration and that other steps may be added or existing steps may be removed or modified.

As shown in FIG. 4, the kernel 230 may receive an indication that an application program is being initiated by a user, in step 405. The application may be a type of messaging software and the user may have previously specified the filtering criteria. If the user has not specified any filtering criteria, the kernel 230 may process network message traffic conventionally. In step 410, the kernel 230 may initiate the kernel filtering process with the received filtering criteria from the application program.

Figure 5:
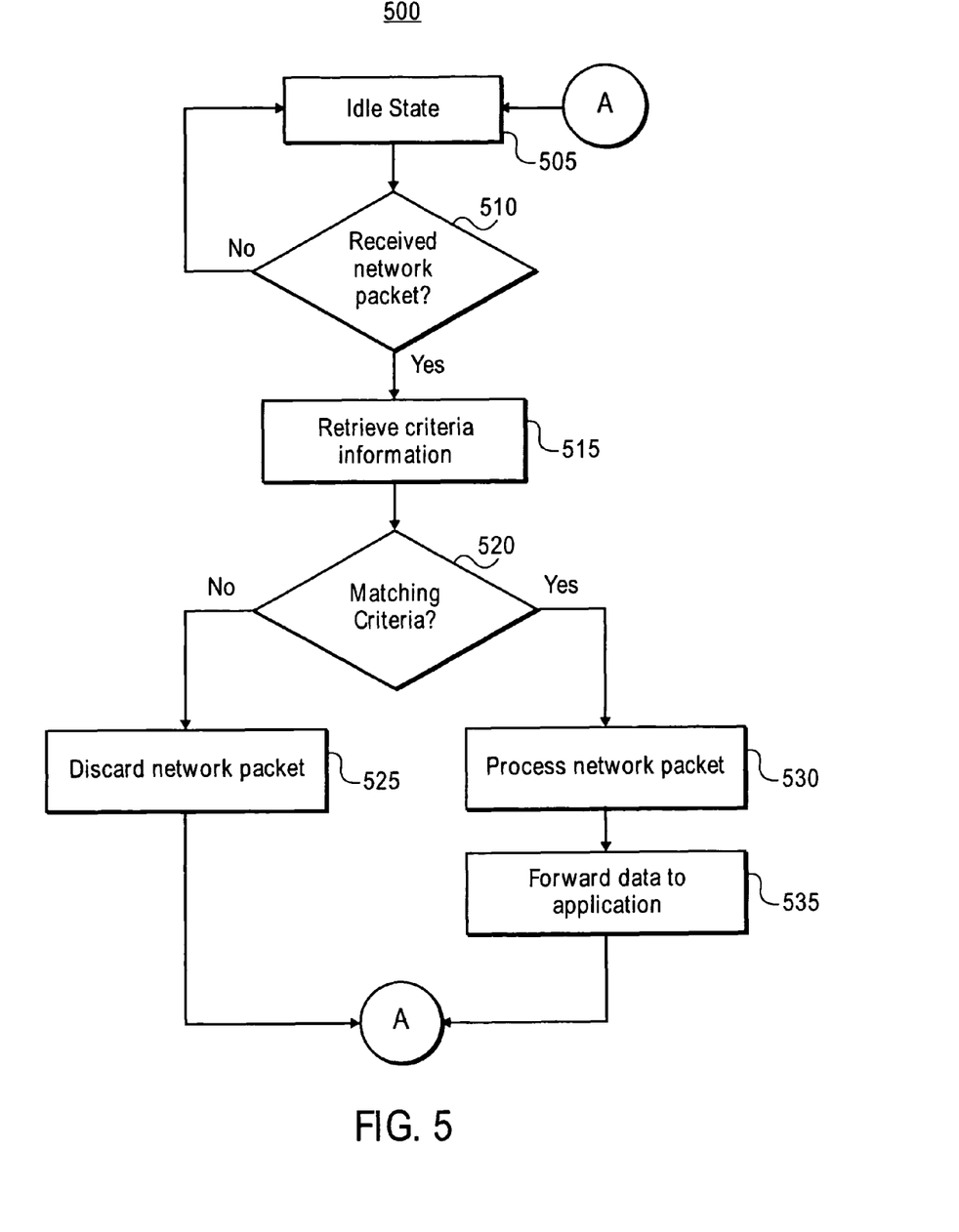
FIG. 5 illustrates another flow diagram implemented by the kernel filtering process in accordance with yet another embodiment.

FIG. 5 illustrates a flow diagram 500 implemented by the kernel filtering process 230 in accordance with yet another embodiment. It should be readily apparent to those of ordinary skill in the art that the flow diagram 500 depicted in FIG. 5 represents a generalized illustration and that other steps may be added or existing steps may be removed or modified.

As shown in FIG. 5, the kernel filtering process 120 may be configured to be in an idle state, in step 505. In step 510, the kernel filtering process 120 may determine whether a network packet has been received. For example, the kernel filtering process 120 may check a register to determine whether a network packet has been received.

If a network packet has not been received, the kernel filtering process 120 may return to the idle state in step 505. Otherwise, if a network packet has been received, the kernel filtering process 120 may retrieve the criteria in the form of a self-describing data structure from the header of the received network packet.

In step 520, the kernel filtering process 120 may compare the received criteria with the criteria received from the application. If there is non-matching condition between the criteria, the kernel filtering process 120 may discard the received network packet, in step 525. Subsequently, the kernel filtering process 120 returns to the idle state of step 505.

Otherwise, if there is matching condition, the kernel filtering process 120 may forward the received network packet to the kernel 230 for processing of the network packet, in step 530. In step 535, the data contained in the received network packet is forwarded to the one or more applications by the kernel 230. Subsequently, the kernel filtering process 120 returns to the idle state of step 505.

Figure 6:
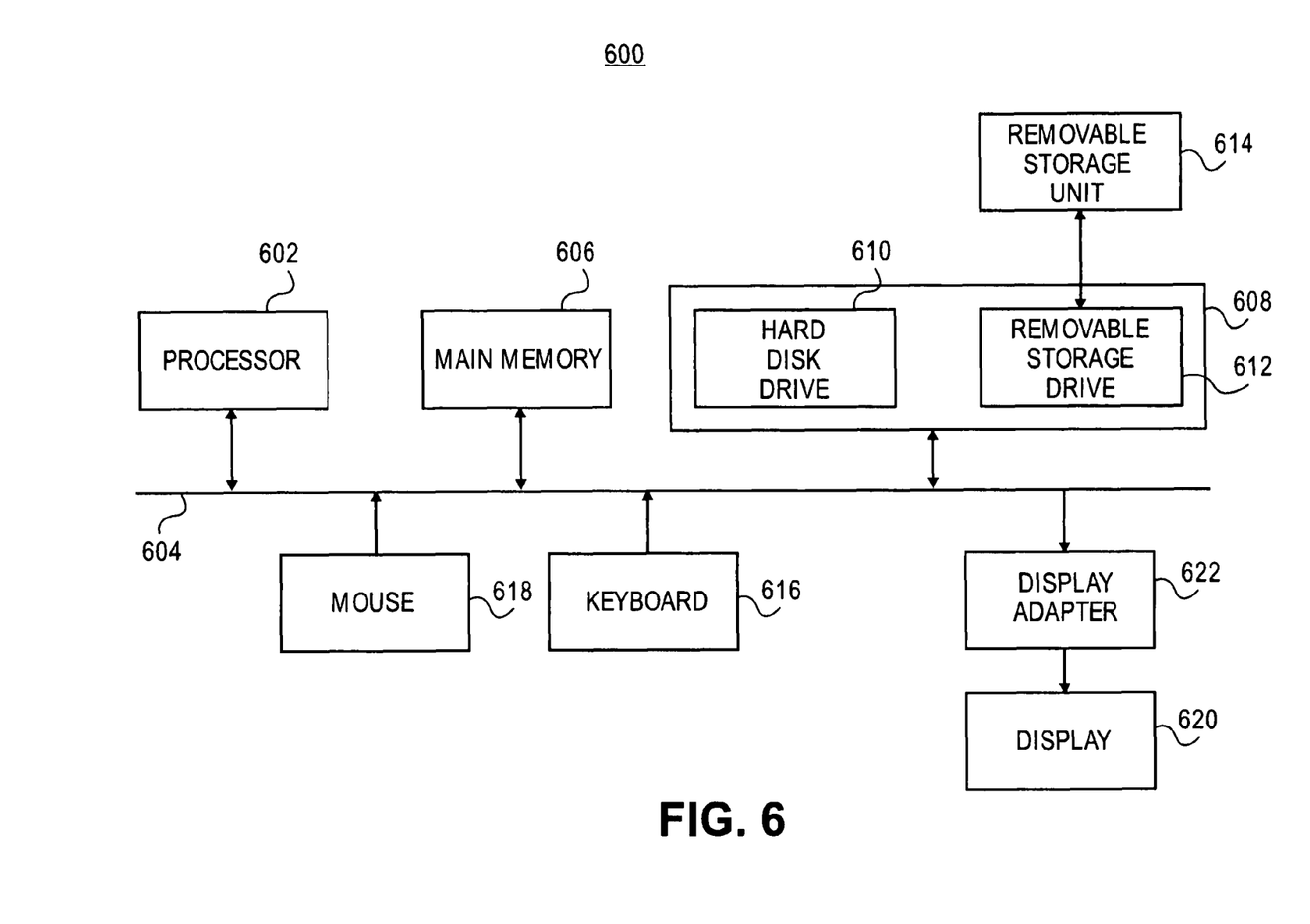
FIG. 6 illustrates an exemplary block diagram of a computing platform where an embodiment may be practiced.

FIG. 6 illustrates an exemplary block diagram of a computing platform 600 where an embodiment may be practiced. The functions of the kernel filtering process may be implemented in program code and executed by the computing platform 600. The visual enhancement module may be implemented in computer languages such as PASCAL, C, C++, JAVA, etc.

As shown in FIG. 6, the computer system 600 includes one or more processors, such as processor 602 that provide an execution platform for embodiments of the kernel filtering process. Commands and data from the processor 602 are communicated over a communication bus 604. The computer system 600 also includes a main memory 606, such as a Random Access Memory (RAM), where the software for the RPS may be executed during runtime, and a secondary memory 608. The secondary memory 608 includes, for example, a hard disk drive 620 and/or a removable storage drive 622, representing a floppy diskette drive, a magnetic tape drive, a compact disk drive, etc., where a copy of a computer program embodiment for the kernel filtering process may be stored. The removable storage drive 622 reads from and/or writes to a removable storage unit 624 in a well-known manner. A user interfaces with the application program with a keyboard 626, a mouse 628, and a display 620. The display adaptor 622 interfaces with the communication bus 604 and the display 620 and receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of filtering messages in a kernel of an operating system executing on at least one processor, said method comprising:
   receiving a message from a network;
   extracting metadata in the form of a self-describing data structure stored in a header of the message;
   checking a register to determine whether the message have been received;
   if the message has not received, a kernel filtering process may return to the idle state; otherwise, kernel filtering process may retrieve the criteria in the form of a self-describing data structure and comparing the received criteria with the criteria received from the application;

determining, automatically in the kernel, information that indicates contents of the message; and selectively passing the message directly from the kernel to one or more applications executing at a user level residing on the at least one processor and distinct from the network based on the information residing entirely in the kernel that indicates the contents of the message and according to at least one criterion, wherein selectively passing the data comprises:

transmitting the message to the one or more applications when the at least one criteria is satisfied and disregarding the message when the at least one criterion is not satisfied and wherein the at least one criterion is:

provided by at least one of the one or more applications during initialization, and applied in the kernel to the information that indicates the contents of the message.

2. The method of claim 1, wherein the information is formatted in a self-describing data structure.

3. The method of claim 2, wherein the information is formatted in a structured mark-up language.

4. The method of claim 1, further comprising providing the at least one criterion during initialization of an application of the one or more applications.

5. The method of claim 1, further comprising:

attaching the information relating to the content of a selected message in a header; and forwarding the selected message over the network.

6. A computer readable storage medium on which is embedded one or more computer programs, said one or more computer programs implementing a method of filtering network messages in a kernel of an operating system executing on at least one processor, said one or more computer programs comprising a set of instructions for:

receiving a message from a network;

extracting metadata in the form of a self-describing data structure stored in a header of the message;

checking a register to determine whether the message have been received;

if the message has not received, a kernel filtering process may return to the idle state; otherwise, kernel filtering process may retrieve the criteria in the form of a self-describing data structure and comparing the received criteria with the criteria received from the application;

determining, automatically in the kernel, information that indicates contents of the message; and selectively passing the message directly from the kernel to one or more applications executing at a user level residing on the at least one processor and distinct from the network based on the information residing entirely in the kernel that indicates the contents of the message and according to at least one criterion, wherein selectively passing the data comprises:

transmitting the message to the one or more applications when the at least one criteria is satisfied and disregarding the message when the at least one criterion is not satisfied and wherein the at least one criterion is:

provided by at least one of the one or more applications during initialization, and applied in the kernel to the information that indicates the contents of the message.

7. The computer readable storage medium according to claim 6, wherein said set of instructions further comprises providing the information in a self-describing data format.

8. The computer readable storage medium according to claim 6, wherein said set of instructions further comprises providing the information in a structured markup language format.

9. The computer readable storage medium according to claim 6, wherein said set of instructions further comprises receiving the information in a header attached to a message packet.

10. The computer readable storage medium according to claim 6, wherein said set of instructions further comprises:

providing for a selected message packet;

concatenating the information in a header to the selected message packet; and transmitting the selected message packet over the network.

11. A system for filtering network message packets, the system comprising:

a memory; and at least one processor configured to interface with the memory and to execute a kernel filtering process in a kernel configured to:

receive a message from a network, extracting metadata in the form of a self-describing data structure stored in a header of the message;

checking a register to determine whether the message have been received;

if the message has not received, a kernel filtering process may return to the idle state; otherwise, kernel filtering process may retrieve the criteria in the form of a self-describing data structure and comparing the received criteria with the criteria received from the application;

determining, automatically in the kernel, information that indicates contents of the message; and selectively passing the message directly from the kernel to one or more applications executing at a user level residing on the at least one processor and distinct from the network based on the information residing entirely in the kernel that indicates the contents of the message and according to at least one criterion, wherein selectively passing the data comprises:

transmitting the message to the one or more applications when the at least one criteria is satisfied and disregarding the message when the at least one criterion is not satisfied and wherein the at least one criterion is:

provided by at least one of the one or more applications during initialization, and applied in the kernel to the information that indicates the contents of the message.

12. The system of claim 11, wherein the information is formatted in a self-describing data structure.

13. The system of claim 12, wherein the information is formatted in a structured mark-up language.

14. The system of claim 11, wherein the kernel filtering process is further configured to attach the information relating to the content of a selected message in a header and to forward the selected message over the network.

* * * * *